(12) United States Patent
Yoon et al.

(10) Patent No.: US 12,045,008 B2
(45) Date of Patent: Jul. 23, 2024

(54) HOLOGRAPHIC MICROSCOPE

(71) Applicant: Korea Photonics Technology Institute, Gwangju (KR)

(72) Inventors: Seon Kyu Yoon, Gwangju (KR); Ha Mong Shim, Gwangju (KR); Jin Su Lee, Gwangju (KR); Kwang Hoon Lee, Anyang-si (KR)

(*) Notice: Subject to any disclaimer, the term of this patent is extended or adjusted under 35 U.S.C. 154(b) by 199 days.

(21) Appl. No.: 17/403,960

(22) Filed: Aug. 17, 2021

(65) Prior Publication Data

US 2022/0206432 A1    Jun. 30, 2022

(30) Foreign Application Priority Data

Dec. 28, 2020    (KR) .................. 10-2020-0184484
Dec. 30, 2020    (KR) .................. 10-2020-0188151

(51) Int. Cl.
*G03H 1/00*    (2006.01)
*G01B 9/021*    (2006.01)
(Continued)

(52) U.S. Cl.
CPC .......... *G03H 1/0005* (2013.01); *G01B 9/021* (2013.01); *G01B 11/164* (2013.01);
(Continued)

(58) Field of Classification Search
CPC .... G01B 9/021; G01B 11/164; G03H 1/0005; G03H 1/0043; G03H 1/0866; G03H 2001/005; G03H 2001/0415
See application file for complete search history.

(56) References Cited

U.S. PATENT DOCUMENTS

2008/0018966 A1*   1/2008   Dubois .................. G01B 9/021
                                                          359/9
2019/0250392 A1*   8/2019   Cuche .................. G03H 1/0443
                            (Continued)

FOREIGN PATENT DOCUMENTS

JP           H09281003 A        10/1997
KR      10-2016-0086347          7/2016
                            (Continued)

OTHER PUBLICATIONS

English Specification of JPH09281003A published on Oct. 31, 1997.
(Continued)

*Primary Examiner* — Michael A Lyons
(74) *Attorney, Agent, or Firm* — ANTONIO HA & U.S. PATENT, LLC

(57) ABSTRACT

According to an embodiment, a holographic microscope comprises a light source, an optical system splitting light emitted from the light source into an object and a reflective mirror and inducing interference between light reflected by the object or transmitted through the object and light reflected by the reflective mirror, a first image sensor receiving the interference light and sensing interference information for the interference light, a second image sensor receiving the light reflected by the object or transmitted through the object and sensing information for the received light, and an image processor deriving a shape of the object based on the interference information sensed by the first image sensor and the information sensed by the second image sensor.

6 Claims, 7 Drawing Sheets

(51) Int. Cl.
  *G01B 11/16* (2006.01)
  *G03H 1/04* (2006.01)
  *G03H 1/08* (2006.01)

(52) U.S. Cl.
  CPC ......... *G03H 1/0402* (2013.01); *G03H 1/0443* (2013.01); *G03H 1/0866* (2013.01); *G03H 2001/005* (2013.01); *G03H 2001/0415* (2013.01)

(56) References Cited

U.S. PATENT DOCUMENTS

2020/0271434 A1* 8/2020 Ishigaki .................. G01B 9/021
2022/0210321 A1* 6/2022 Koshel ................. H04N 23/676
2022/0397392 A1* 12/2022 Courteville .......... G01B 9/0209

FOREIGN PATENT DOCUMENTS

KR       10-1789441        10/2017
KR    10-2019-0022690       3/2019

OTHER PUBLICATIONS

English Specification of 10-2019-0022690 published on Mar. 6, 2019.
English Specification of 10-2016-0086347 published on Jul. 19, 2016.
English Specification of 10-1789441 published on Oct. 23, 2017.

* cited by examiner

HOLOGRAPHIC MICROSCOPE

CROSS-REFERENCE TO RELATED APPLICATION(S)

This application is based on and claims priority under 35 U.S.C. 119 to Korean Patent Application Nos. 10-2020-0184484, filed on Dec. 28, 2020, and 10-2020-0188151, filed on Dec. 30, 2020, in the Korean Intellectual Property Office, the disclosures of which are herein incorporated by reference in their entireties.

TECHNICAL FIELD

The disclosure relates to holographic microscopy and, more specifically to, a holographic microscope capable of accurately measuring an object within a short time.

DESCRIPTION OF RELATED ART

The description of the Discussion of Related Art section merely provides information that may be relevant to embodiments of the disclosure but should not be appreciated as necessarily constituting the prior art.

A common optical microscope is a device that measures the shape of an object by measuring the intensity of light emitted from a light source and reflected or transmitted through the object. A digital holographic microscope is a device that measures the interference and diffraction of light occurring on an object when the light is emitted to the object, records it digitally, and restores the shape information for the object from the recorded information.

Conventional optical holographic microscopes record the interference fringe information for light in a special film. The conventional optical holographic microscope radiates a reference light beam to the special film with the interference fringe recorded therein, thereby restoring a virtual shape of the target object in the place where the target object used to be originally positioned.

Meanwhile, a digital holographic microscope generates light of a single wavelength, such as a laser beam, and divides it into two light beams using an optical splitter. One light beam travels directly to the image sensor (this light beam is referred to as reference light), and the other light beam travels to the target object to be measured. When the light reflected from the target object travels to the image sensor (this light is referred to as object light), the reference light and object light may interfere with each other on the image sensor. The digital holographic microscope records such light interference fringe information with a digital image sensor, and restores the shape of the target object to be measured using the recorded interference fringe information. In this case, the recorded interference fringe information is generally referred to as a hologram.

The digital holographic microscopy differs from the conventional optical holographic microscopy in the following points of view. The digital holographic microscopy measures the interference fringe information for light with a digital image sensor and stores it digitally. Further, the digital holographic microscopy restores the shape of the target object by processing the stored interference fringe information not by an optical method but by a numerical calculation method using a computer device.

However, conventional optical holographic microscopy is capable of sensing interference information in a considerably limited length or width by the image sensor. Thus, it may take a considerable amount of time to recognize the shape of the object.

SUMMARY

According to an embodiment of the disclosure, there is provided a holographic microscope capable of securing both accuracy and a reduced sensing time using a plurality of image sensors.

According to an embodiment, a holographic microscope comprises a light source, an optical system splitting light emitted from the light source into an object and a reflective mirror and inducing interference between light reflected by the object or transmitted through the object and light reflected by the reflective mirror, a first image sensor receiving the interference light and sensing interference information for the interference light, a second image sensor receiving the light reflected by the object or transmitted through the object and sensing information for the received light, and an image processor deriving a shape of the object based on the interference information sensed by the first image sensor and the information sensed by the second image sensor.

According to an embodiment, the first image sensor may be implemented as a charge coupled device (CCD).

According to an embodiment, the second image sensor may be implemented as a plenoptic camera.

According to an embodiment, the optical system may include a Michelson Interferometer or a Mach Zehnder Interferometer.

According to an embodiment, the optical system may allow the interference light to be incident onto the first image sensor and allow only the light reflected by the object or transmitted through the object to be incident onto the second image sensor.

According to an embodiment, a holographic microscope comprises a light source, a first beam splitter splitting light emitted from the light source into an object and a reflective mirror and transmitting one of light reflected by the object and light reflected by the reflective mirror while reflecting the other of the light reflected by the object and the light reflected by the reflective mirror, a second beam splitter transmitting the light reflected from the first beam splitter to the object, the second beam splitter transmitting part of the light reflected by the object while reflecting a rest of the light reflected by the object, a first image sensor receiving light which undergoes interference while passing through the first beam splitter and sensing interference information for the interference light, a second image sensor receiving the light reflected by the second beam splitter and sensing information for the received light, and an image processor deriving a shape of the object based on the interference information sensed by the first image sensor and the information sensed by the second image sensor.

According to an embodiment, the first image sensor may be implemented as a charge coupled device (CCD).

According to an embodiment, the second image sensor may be implemented as a plenoptic camera.

According to an embodiment, the holographic microscope may further comprise a shutter determining whether to allow the light split from the first beam splitter to the reflective mirror to travel to the reflective mirror.

According to an embodiment, the shutter may block the light traveling to the reflective mirror to allow only the light reflected by the object to be incident onto the second image sensor. According to an embodiment, the shutter may allow the light to travel to the reflective mirror and cause interference between the light reflected by the object while passing through the first beam splitter and the light reflected by the reflective mirror.

According to an embodiment of the disclosure, it is possible to quickly and accurately sense a target object and recognize its shape using a plurality of image sensors.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Various changes may be made to the disclosure, and the disclosure may come with a diversity of embodiments. Some embodiments of the disclosure are shown and described in connection with the drawings. However, it should be appreciated that the disclosure is not limited to the embodiments, and all changes and/or equivalents or replacements thereto also belong to the scope of the disclosure. Similar reference denotations are used to refer to similar elements throughout the drawings.

The terms "first" and "second" may be used to describe various components, but the components should not be limited by the terms. The terms are used to distinguish one component from another. For example, a first component may be denoted a second component, and vice versa without departing from the scope of the disclosure. The term "and/or" may denote a combination(s) of a plurality of related items as listed or any of the items.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

The terms as used herein are provided merely to describe some embodiments thereof, but not to limit the disclosure. As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

Unless otherwise defined, all terms including technical and scientific terms used herein have the same meaning as commonly understood by one of ordinary skill in the art to which the embodiments of the disclosure belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The components, processes, steps, or methods according to embodiments of the disclosure may be shared as long as they do not technically conflict with each other.

Figure 1:
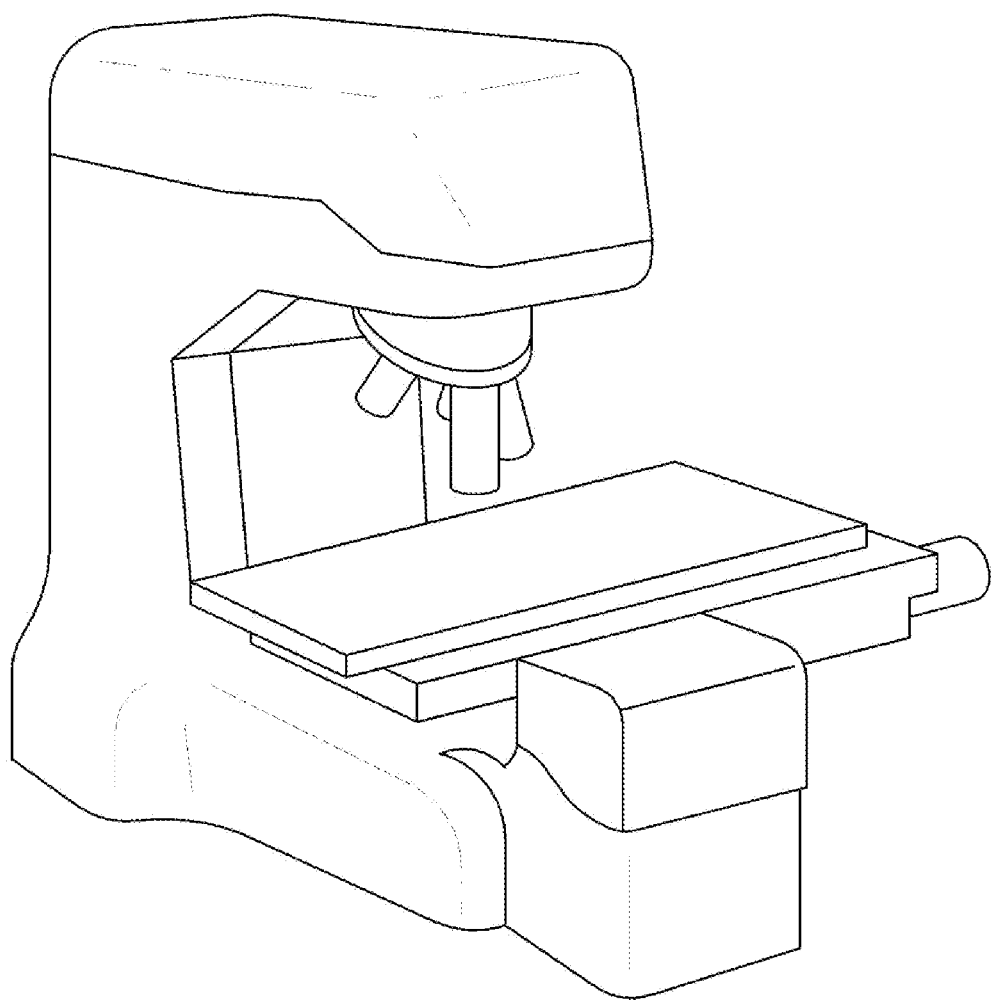
FIG. 1 is a view illustrating a holographic microscope according to an embodiment of the disclosure.

FIG. 1 is a view illustrating a holographic microscope according to an embodiment of the disclosure.

The holographic microscope 100 measures the shape of an object by analyzing holographic information acquired using the interference phenomenon and the light reflected from or transmitted through the object (hereinafter referred to as 'object light'). The holographic microscope 100 radiates light and divides the emitted light into object light and light that is traveling towards a reflective mirror or in a separate optical path (this light is referred to as 'reference light') to induce interference with the object light. The holographic microscope 100 receives the interference light of both the object light and reference light using an image sensor and senses interference information for the interference light, and the holographic microscope 100 receives the object light or interference light using another image sensor and senses diffraction information. The holographic microscope 100 acquires three-dimensional (3D) information for the object, such as the shape of the object, based on the information sensed by each sensor. Throughout the specification, the term "interference light" may refer to light resultant from interference between two light beams.

Figure 2:
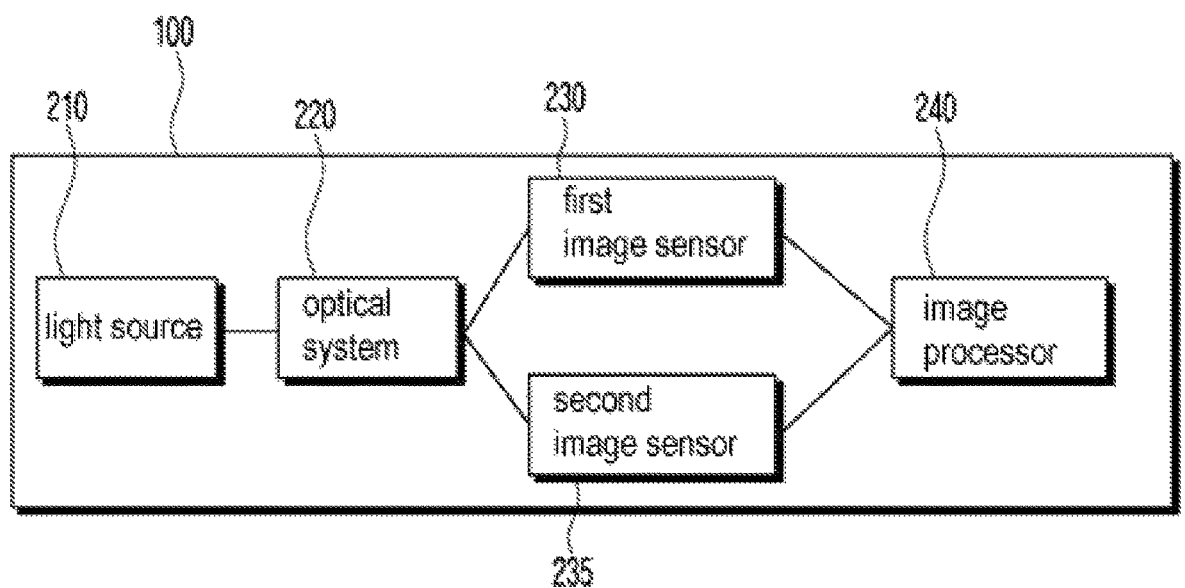
FIG. 2 is a view illustrating a configuration of a holographic microscope according to an embodiment of the disclosure.

FIG. 2 is a view illustrating a configuration of a holographic microscope according to an embodiment of the disclosure.

Referring to FIG. 2, a holographic microscope 100 according to an embodiment of the disclosure may include a light source 210, an optical system 220, a first image sensor 230, a second image sensor 235, an image processor 240, and a controller (not shown).

The light source 210 radiates light to the optical system 220. The light source 210 radiates light to the optical system 220 so that the optical system 220 may form object light, reference light, or interference light. Light emitted from the light source 210 may have a visible light wavelength band, or may have a wavelength band, such as of an X ray or ultraviolet (UV) ray, other than the visible light wavelength band.

The optical system 220 divides the light emitted from the light source 210 into object light and reference light and allows the object light and reference light to interfere with each other. The optical system 220 splits the light emitted from the light source 210 towards the object to become the object light, allowing the light to be reflected or transmitted through the object. The optical system 220 splits the light emitted from the light source 210 towards a reflective or off the object to become the reference light. The optical system 220 allows the divided light beams to travel along their respective optical paths, but finally to travel along one optical path. While traveling along one optical path, the two light beams interfere with each other. The interference light resultant as the object light and the reference light interfere with each other includes information about the interference by the object. The interference information may be information by which 3D information for the object, e.g., the shape of the object, may be known, and the interference information may include, e.g., intensity, amplitude, or phase of the interference light. The optical system 220 allows the interference light to travel to the first image sensor 230.

Apart from the interference between the split light beams, the optical system 220 may allow the object light to independently proceed without interference with the reference light. The optical system 220 may split the object light into different paths or may block the reference light, so that only the object light that does not interfere with the reference light may travel along a different path. The optical system 220 allows only the object light to travel to the second image sensor 235. However, without limitations thereto, the optical system 220 may allow the interference light to proceed.

The first image sensor 230 receives the interference light and senses the interference information. The first image sensor 230 may be implemented as various sensors, e.g., a charge coupled device (CCD) camera or optical sensor, capable of sensing interference information, e.g., the intensity, amplitude, or phase of the light. The first image sensor 230 may sense a step shorter than the wavelength of light emitted from the light source 210, from the interference light. Accordingly, since the first image sensor 230 may sense a step shorter than the wavelength of the emitted light, the first image sensor 230 may accurately recognize the 3D information for the object. However, the first image sensor 230 may have difficulty in sensing a step longer than the wavelength of the emitted light, the first image sensor 230 may recognize 3D information for the object at high speed. Thus, the first image sensor 230 receives the interference light and senses the interference information and finely or accurately sense the object.

The second image sensor 235 receives object light and senses diffraction information. The second image sensor 235 may be implemented as various sensors, e.g., a plenoptic camera, capable of sensing diffraction information. Unlike the first image sensor 230, the second image sensor 235 may sense a step longer than the wavelength of the emitted light but, like the first image sensor 230, may have difficulty in sensing a relatively fine or tiny or short step.

Accordingly, the second image sensor 235 receives object light and senses diffraction information, and quickly senses the object macroscopically.

The image processor 240 acquires 3D information for the object based on the information sensed by each of the image sensors 230 and 235. The image processor 240 may accurately obtain the 3D information for the object within a short time based on the macroscopic information derived from the diffraction information and fine or tiny information for the object derived from the interference information, from each of the image sensors 230 and 235.

The controller (not shown) controls the operation of each component in the holographic microscope 100. For example, the controller (not shown) controls the optical system 220 so that the object light may be incident only to the second image sensor 235 or the interference light may be incident to the first image sensor 230.

Figure 3:
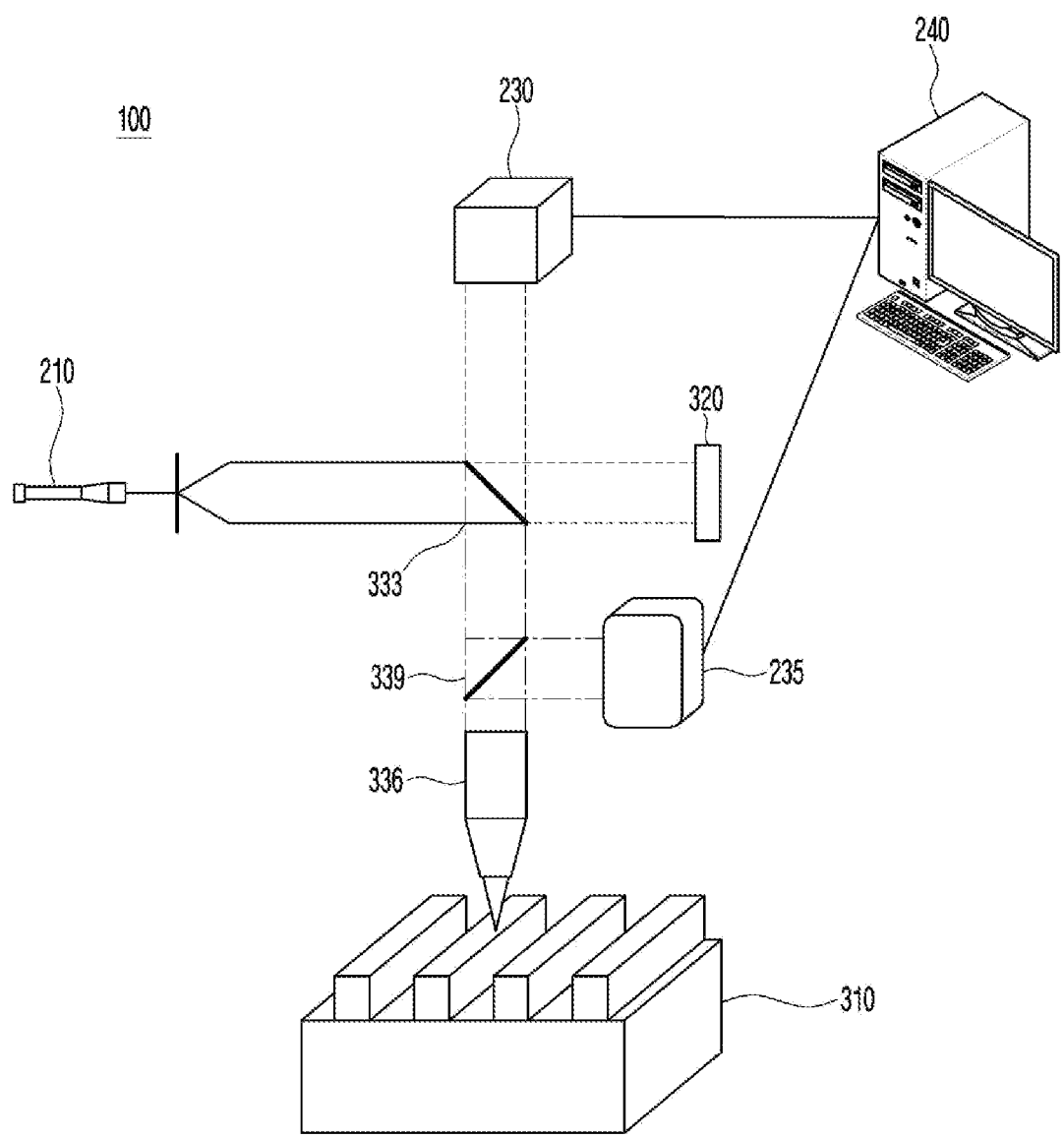
FIG. 3 is a view illustrating an optical system according to a first embodiment of the disclosure.

FIG. 3 is a view illustrating an optical system according to a first embodiment of the disclosure.

Referring to FIG. 3, the optical system 220 according to the first embodiment of the disclosure may be implemented as a Michelson interferometer, and the optical system 220 may include a first beam splitter 333, an objective lens 336, and a second beam splitter 339.

The first beam splitter 333 receives the light emitted from the light source 210, splits the light into the object 310 and the reflective mirror 320, and allows the light beams reflected by the components 310 and 320 to travel along the same path. The first beam splitter 333 splits the incident light emitted from the light source 210 to the object 310 and the reflective mirror 320, respectively. The light split to the object 310 by the first beam splitter 333 becomes object light, and the light split to the reflective mirror 320 becomes the reference light. The light reflected towards the object 310 travels to the object 310 through the objective lens 336 and is reflected by the object 310. The light split to the reflective mirror 320 is reflected by the reflective mirror 320.

The first beam splitter 333 transmits one of the object light and the reference light and reflects the other, thereby allowing the two light beams to travel along the same path. Both the light beams interfere with each other while traveling along the same path. Although FIG. 3 illustrates that the first beam splitter 333 transmits the object light and reflects the reference light, embodiments of the disclosure are not limited thereto.

The objective lens 336 receives the light split from the first beam splitter 333 to the object 310 and focuses the received light onto the object 310.

The second beam splitter 339 is disposed between the first beam splitter 333 and the objective lens 336 along the optical path and splits part of the object light reflected from the object 310, to the second image sensor 235. The second beam splitter 339 transmits the light reflected by the first beam splitter 333 to the object 310 and splits part of the object light reflected by the object 310 to the second image sensor 235, so that the object light may be sensed by the second image sensor 235.

The object light transmitted through the second beam splitter 339 interferes with the reference light reflected by the first beam splitter 333 while traveling along the same path as the reference path. The interference light is incident on the first image sensor 230.

Figure 4:
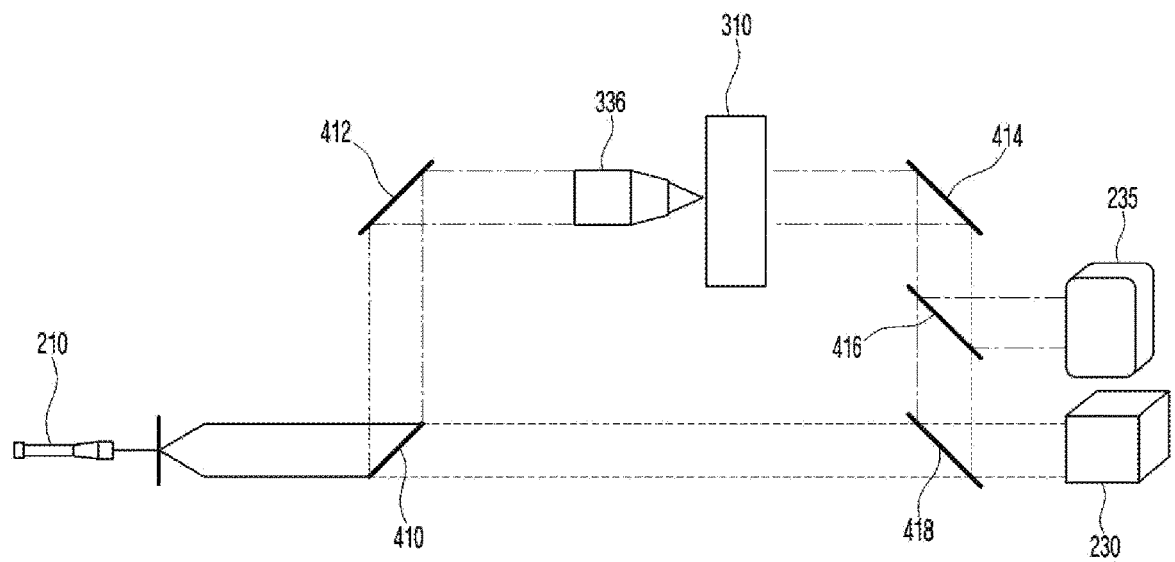
FIG. 4 is a view illustrating an optical system according to a second embodiment of the disclosure.

FIG. 4 is a view illustrating an optical system according to a second embodiment of the disclosure.

Referring to FIG. 4, the optical system 220 according to the second embodiment of the disclosure may be implemented as a Mach Zehnder interferometer, and may include a first beam splitter 410, a first mirror 412, a second mirror 414, a second beam splitter 416, and a third beam splitter 418.

The first beam splitter 410 receives the light emitted from the light source 210 and splits part of the received light to the object 310. The first beam splitter 410 splits part of the incident light to the first mirror 412 to pass through the object 310, and transmits the rest of the incident light to become reference light.

The first mirror 412 reflects the light split by the first beam splitter 410 to the objective lens 336.

The light split by the first beam splitter 410 and reflected by the first mirror 412 passes through the objective lens 336 and then the object 310. The object 310 disposed in the Mach-Zehnder interferometer may be formed of a material that transmits incident light, rather than a material that reflects incident light, and the object 310 receives and transmits the light that has passed through the objective lens 336.

The second mirror 414 reflects the object light, which has passed through the object 310, to the third beam splitter 418.

The second beam splitter 416 is disposed between the second mirror 414 and the third beam splitter 418 along the optical path, splitting part of the object light to the second image sensor 235. Since only object light is reflected by the second mirror 414, the second beam splitter 416 splits part of the object light to the second image sensor 235.

The third beam splitter 418 allows the incident reference light to travel along the same path as the object light. The reference light passes through the first beam splitter 410 and is directly incident onto the third beam splitter 418, and the object light is reflected by the second mirror 414 and is incident onto the third beam splitter 418. The third beam splitter 418 transmits the reference light (in some cases, reflects the reference light) while reflecting the object light (in some cases, transmits the object light), so that both the reference light and the object light travel along the same path. Both the light beams interfere with each other while traveling along the same path, and the resultant interference light is incident onto the first image sensor 230.

In the optical system according to the second embodiment, since the respective paths of the object light and the interference light do not overlap, the interference light may be incident onto the first image sensor 230 and the object light may be incident onto the second image sensor 235.

Figure 5:
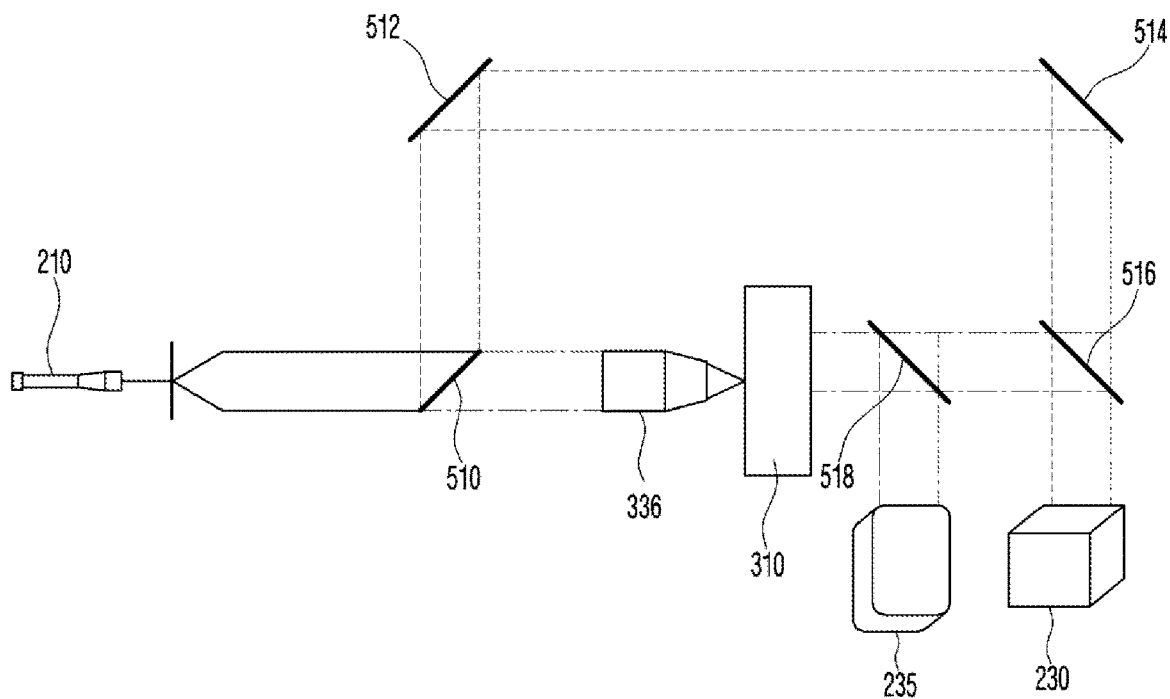
FIG. 5 is a view illustrating an optical system according to a third embodiment of the disclosure.

FIG. 5 is a view illustrating an optical system according to a third embodiment of the disclosure.

Referring to FIG. 5, the optical system 220 according to the third embodiment of the disclosure may be implemented as a Mach Zehnder interferometer, and may include a first beam splitter 510, a first mirror 512, a second mirror 514, a second beam splitter 516, and a third beam splitter 518.

The first beam splitter 510 receives the light emitted from the light source 210 and splits part of the received light. The first beam splitter 510 transmits part of the incident light, as it is, so that the part of the incident light is transmitted through the object 310 while splitting the rest of the incident light to the first mirror 512 to become reference light.

The first mirror 512 and the second mirror 514 reflect the incident light so that the light split from the first beam splitter 510 is incident onto the second beam splitter 516 without passing through the object 310. The first mirror 512 reflects the light split from the first beam splitter 510 to the second mirror 514, and the second mirror 514 reflects the light reflected from the first mirror 512 to the second beam splitter 516, so that the reference light, which does not pass through the object, travel to the second beam splitter 516.

The light transmitted through the first beam splitter 510 passes through the objective lens 336 and then the object 310.

The third beam splitter 518 splits part of the light transmitted through the object 310 to the second image sensor 235. The third beam splitter 518 is disposed on the path along which the object light travels, splitting part of the light to the second image sensor 235. Accordingly, the second image sensor 235 may receive and sense the object light.

The second beam splitter 516 allows the object light transmitted through the third beam splitter 518 and the reference light reflected from the second mirror 514 to travel along the same path. The second beam splitter 516 transmits one of the reference light and object light incident onto the second beam splitter 516 to the first image sensor 230 while reflecting the other to the first image sensor, thereby allowing the reference light and the object light to interfere with each other. Accordingly, the first image sensor 230 may receive and sense the interference light. Like in the optical system according to the second embodiment, in the optical system according to the third embodiment, since the respective paths of the object light and the interference light do not overlap, the interference light may be incident onto the first image sensor 230 and the object light may be incident onto the second image sensor 235.

Figure 6:
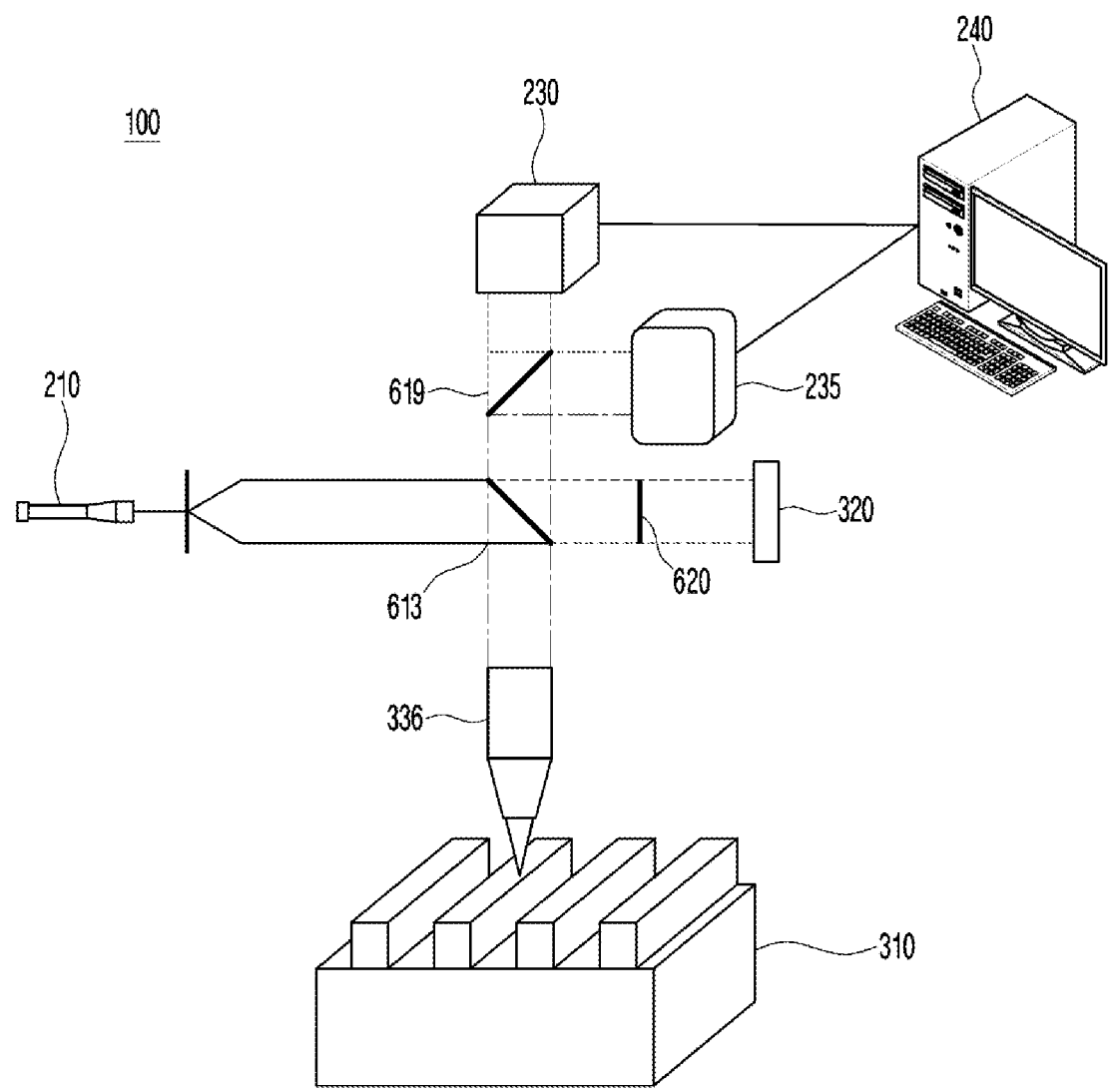
FIG. 6 is a view illustrating an optical system according to a fourth embodiment of the disclosure.

FIG. 6 is a view illustrating an optical system according to a fourth embodiment of the disclosure.

Referring to FIG. 6, the optical system 220 according to the fourth embodiment of the disclosure may be implemented as a Michelson interferometer, and the optical system 220 may include a first beam splitter 613, an objective lens 336, a second beam 619, and a shutter 620.

The first beam splitter 613 performs the same operation as the first beam splitter 333. The second beam splitter 619 is disposed between the first beam splitter 613 and each of the image sensors 230 and 235 along the optical path, so that the interference light travels to the first image sensor 230 and the object light travels to the second image sensor 235. The second beam splitter 619 allows the light, which has passed through the first beam splitter 613, to any one image sensor between the first beam splitter 613 and each of the image sensors 230 and 235. When the shutter 620 does not block the reference light, the interference light, which has passed through the first beam splitter 613, is incident onto the second beam splitter 619. The second beam splitter 619 transmits (in some cases, reflects) the interference light to be incident onto the first image sensor 230. Conversely, when the shutter 620 blocks the reference light, the object light, which has passed through the first beam splitter 613, is incident onto the second beam splitter 619. The second beam splitter 619 reflects (in some cases, transmits) the object light and allows the object light to be incident onto the second image sensor 235.

The shutter 620 is disposed between the first beam splitter 613 and the reflective mirror 320 to determine whether or not allow the reference light to travel to the reflective mirror 320. When the shutter 620 blocks the entry of the light transmitted through the first beam splitter 613 into the reflection mirror 320, no reference light is not generated in the optical system 220. Even when passing through the first beam splitter 613, no interference light is generated, and only object light is transmitted. Accordingly, the object light may be incident onto the second image sensor 235. When the shutter 620 does not block the entry of the light transmitted through the first beam splitter 613 into the reflective mirror 320, the reference light becomes interference light while traveling to the first beam splitter 613, and the interference light is transmitted through the second beam splitter 619 and incident onto the first image sensor 230. The shutter 620 may allow the optical system 220 to allow only the interference light and object light to be incident onto the first image sensor 230 and the second image sensor 235, respectively.

Figure 7:
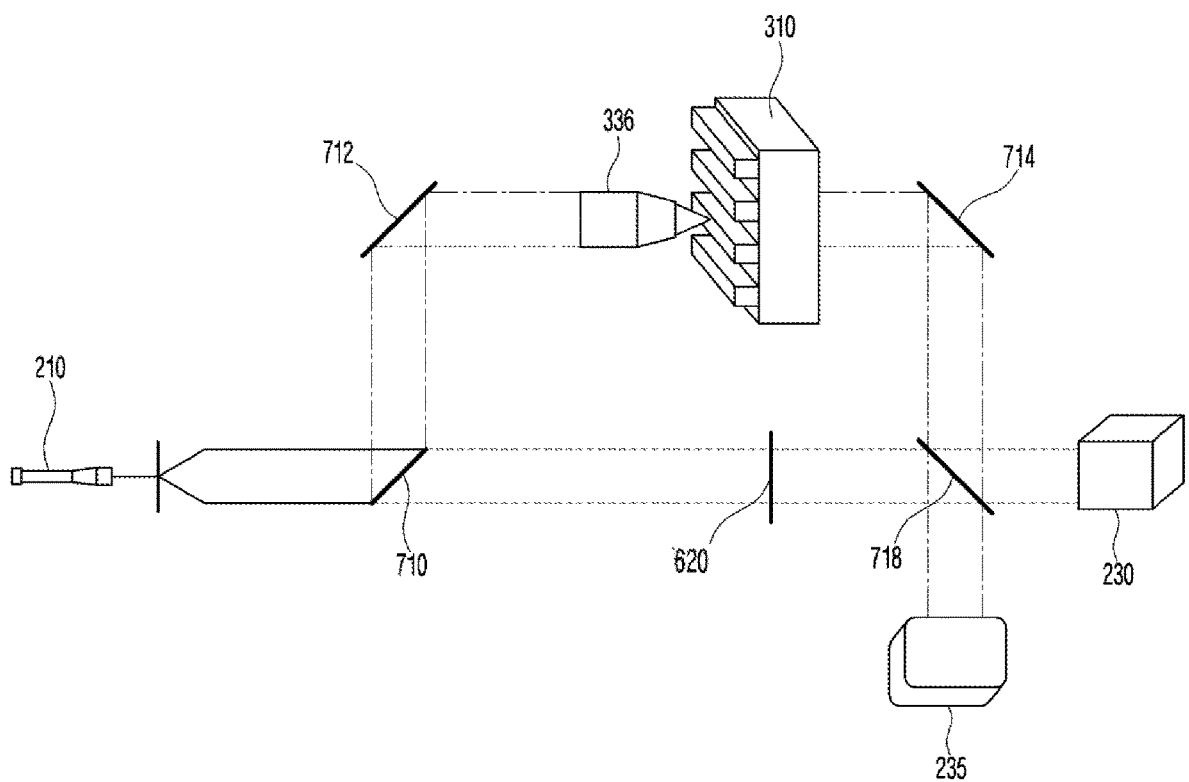
FIG. 7 is a view illustrating an optical system according to a fifth embodiment of the disclosure.

FIG. 7 is a view illustrating an optical system according to a fifth embodiment of the disclosure.

Referring to FIG. 7, the optical system 220 according to the fifth embodiment of the disclosure may be implemented as a Mach Zehnder interferometer, and may include a first beam splitter 710, a first mirror 712, a second mirror 714, a second beam splitter 718, and a shutter 620.

The first beam splitter 710 performs the same operation as the first beam splitter 410.

The first mirror 712 performs the same operation as the first mirror 412.

The light split from the first beam splitter 710 and reflected by the first mirror 712 passes through the objective lens 336 and then the object 310. The object 310 disposed in the Mach-Zehnder interferometer may be formed of a material that transmits incident light, rather than a material that reflects incident light, and the object 310 receives and transmits the light that has passed through the objective lens 336.

The second mirror 714 performs the same operation as the second mirror 414.

The shutter 620 is disposed between the first beam splitter 710 and the second beam splitter 718, determining whether or not to allow the reference light to travel to the second beam splitter 718. When the shutter 620 blocks entry of the light transmitted through the first beam splitter 710 to the second beam splitter 718, only the object light is transmitted through the second beam splitter 718. Accordingly, the object light may be incident onto the second image sensor 235. When the shutter 620 does not block the entry of the light transmitted through the first beam splitter 710 into the second beam splitter 718, the reference light becomes interference light while traveling to the second beam splitter 713, and the interference light is transmitted through the second beam splitter 718 and incident onto the first image sensor 230. The shutter 620 may allow the optical system 220 to allow only the interference light and object light to be incident onto the first image sensor 230 and the second image sensor 235, respectively.

The third beam splitter 718 splits the incident reference light and object light. The third beam splitter 718 splits the object light reflected from the second mirror 714 into the first image sensor 230 and the second image sensor 235. Meanwhile, when the reference light is incident on the third beam splitter 718 by the shutter 620, the third beam splitter 718 similarly splits the reference light into the first image sensor 230 and the second image sensor 235. Accordingly, when the reference light is blocked by the operation of the shutter, only the object light is split by the third beam splitter 718 and is incident onto the second image sensor 235. When the shutter does not block the reference light, the object light reflected from the third beam splitter 718 and the reference light transmitted through the third beam splitter 718 interfere with each other, and the resultant interference light is incident onto the first image sensor 230.

The positions of the first image sensor 230 and the second image sensor 235 are not limited to those illustrated in FIG. 7, and the positions of the first image sensor 230 and the second image sensor 235 may be changed.

Figure 8:
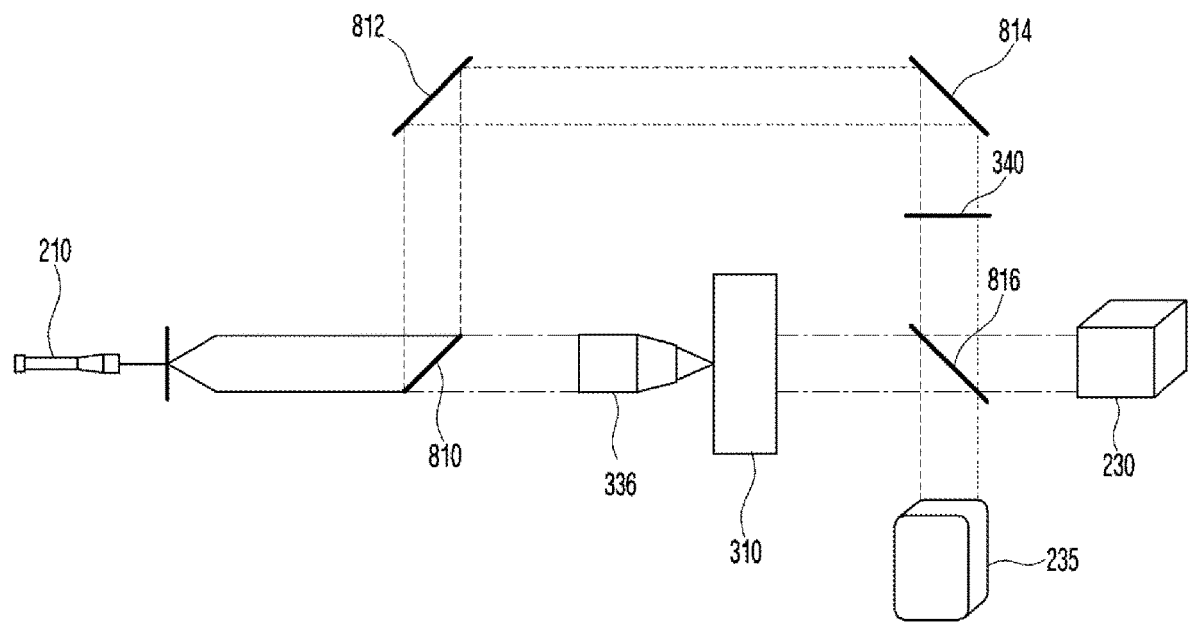
FIG. 8 is a view illustrating an optical system according to a sixth embodiment of the disclosure.

FIG. 8 is a view illustrating an optical system according to a sixth embodiment of the disclosure.

Referring to FIG. 8, the optical system 220 according to the sixth embodiment of the disclosure may be implemented as a Mach Zehnder interferometer, and may include a first beam splitter 810, a first mirror 812, a second mirror 814, a second beam splitter 816, and a shutter 620.

The first beam splitter 810 performs the same operation as the first beam splitter 510.

The first mirror 812 and the second mirror 814 perform the same operation as the first mirror 512 and the second mirror 514, respectively.

The light transmitted through the first beam splitter 810 passes through the objective lens 336 and then the object 310.

The shutter 620 is disposed between the second mirror 814 and the second beam splitter 816 to determine whether or not allow the reference light to travel to the second beam splitter 816. When the shutter 620 blocks entry of the light reflected from the second mirror 814 into the second beam splitter 816, only the object light passes through the second beam splitter 816. Accordingly, the object light may be incident onto the second image sensor 235. When the shutter 620 does not block the entry of the light reflected by the second mirror 814 into the second beam splitter 816, the reference light becomes interference light while traveling to the second beam splitter 816, and the interference light is transmitted through the second beam splitter 816 and incident onto the first image sensor 230.

The second beam splitter 816 splits the incident reference light and object light. The second beam splitter 816 splits the incident object light and the reference light reflected from the second mirror 814 into the first image sensor 230 and the second image sensor 235, respectively. Accordingly, when the reference light is blocked by the operation of the shutter 620, only the object light is split by the second beam splitter 816 and is incident onto the second image sensor 235. When the shutter 620 does not block the reference light, the object light transmitted through the second beam splitter 816 and the reference light reflected from the second beam splitter 816 interfere with each other, and the resultant interference light is incident onto the first image sensor 230.

The positions of the first image sensor 230 and the second image sensor 235 are not limited to those illustrated in FIG. 8, and the positions of the first image sensor 230 and the second image sensor 235 may be changed.

The above-described embodiments are merely examples, and it will be appreciated by one of ordinary skill in the art various changes may be made thereto without departing from the scope of the disclosure. Accordingly, the embodiments set forth herein are provided for illustrative purposes, but not to limit the scope of the disclosure, and should be appreciated that the scope of the disclosure is not limited by the embodiments. The scope of the disclosure should be construed by the following claims, and all technical spirits within equivalents thereof should be interpreted to belong to the scope of the disclosure.

What is claimed is:

1. A holographic microscope, comprising:
a light source;
an optical system splitting light emitted from the light source into an object and a reflective mirror and inducing interference between light reflected by the object or transmitted through the object and light reflected by the reflective mirror;
a first image sensor being implemented as a charge coupled device (CCD) to receive the interference light and sense interference information for the interference light so that the first image sensor senses a step, which is shorter than the wavelength of light emitted from the light source, from the interference light to recognize 3D information for the object;
a second image sensor being implemented as a plenoptic camera to receive the light reflected by the object or transmitted through the object and sense information for the received light so that the second image sensor senses a step which is longer than the wavelength of the emitted light, from the light reflected by the object or transmitted through the object to sense diffraction information; and
an image processor deriving a shape of the object by acquiring 3D information of the object based on the interference information sensed by the first image sensor and the diffraction information sensed by the second image sensor,
wherein the optical system comprises:
a first beam splitter receiving light emitted from the light source, splitting the received light into the object and the reflective mirror, and causing the light reflected from the object and the light reflected from the reflective mirror to travel along the same path; and a second beam splitter being disposed between the first beam splitter and the object on an optical path, transmitting the light reflected from the first beam splitter to the object, splitting a part of an object light reflected by the object to the second image sensor, and transmitting a rest of the object light reflected by the object to interfere with the reference light reflected by the first beam splitter while traveling along the same path as the reference path so that the interference light is incident on the first image sensor.

2. The holographic microscope of claim 1, wherein the optical system includes a Michelson Interferometer or a Mach Zehnder Interferometer.

3. A holographic microscope, comprising:
a light source;
a first beam splitter splitting light emitted from the light source into an object and a reflective mirror and transmitting one of light reflected by the object and light reflected by the reflective mirror while reflecting the other of the light reflected by the object and the light reflected by the reflective mirror to travel along the same path;
a second beam splitter being disposed between the first beam splitter and the object on an optical path, transmitting the light reflected from the first beam splitter to the object, splitting a part of an object light reflected by the object to a second image sensor, and transmitting a rest of the object light reflected by the object to interfere with the reference light reflected by the first beam splitter while traveling along the same path as the reference path so that the interference light is incident on a first image sensor;
the first image sensor being implemented as a charge coupled device (CCD) to receive light which undergoes interference while passing through the first beam splitter and sense interference information for the interference light so that the first image sensor senses a step, which is shorter than the wavelength of light emitted from the light source, from the interference light to recognize 3D information for the object;
the second image sensor being implemented as a plenoptic camera to receive the light reflected by the second beam splitter and sense information for the received light so that the second image sensor senses a step which is longer than the wavelength of the emitted light, from the light reflected by the object or transmitted through the object to sense diffraction information; and
an image processor deriving a shape of the object by acquiring 3D information of the object based on the interference information sensed by the first image sensor and the diffraction information sensed by the second image sensor.

4. The holographic microscope of claim 3, further comprising a shutter determining whether to allow the light split from the first beam splitter to the reflective mirror to travel to the reflective mirror.

5. The holographic microscope of claim 4, wherein the shutter blocks the light traveling to the reflective mirror to allow only the light reflected by the object to be incident onto the second image sensor.

6. The holographic microscope of claim 4, wherein the shutter allows the light to travel to the reflective mirror and causes interference between the light reflected by the object while passing through the first beam splitter and the light reflected by the reflective mirror.

* * * * *